US006660064B2

(12) United States Patent
Golden et al.

(10) Patent No.: US 6,660,064 B2
(45) Date of Patent: Dec. 9, 2003

(54) ACTIVATED CARBON AS SOLE ABSORBENT IN RAPID CYCLE HYDROGEN PSA

(75) Inventors: Timothy Christopher Golden, Allentown, PA (US); Edward Landis Weist, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/094,185

(22) Filed: Mar. 8, 2002

(65) Prior Publication Data

US 2003/0167921 A1 Sep. 11, 2003

(51) Int. Cl.[7] .............................................. B01D 53/047
(52) U.S. Cl. .............................. 95/96; 95/127; 95/130; 95/138; 95/139; 95/140; 95/143; 95/901
(58) Field of Search ...................... 95/96–98, 100–105, 95/127, 130, 138–140, 143, 901; 96/108, 130–133, 153, 154

(56) References Cited

U.S. PATENT DOCUMENTS

| 3,141,748 | A | * | 7/1964 | Hoke et al. ................ 95/99 |
| 3,176,444 | A | | 4/1965 | Kiyonaga .................. 55/26 |
| 3,430,418 | A | | 3/1969 | Wagner .................... 55/25 |
| 3,564,816 | A | | 2/1971 | Batta ....................... 55/26 |
| 3,720,042 | A | * | 3/1973 | Simonet .................. 95/103 |
| 3,839,847 | A | * | 10/1974 | Banikiotes et al. ......... 95/96 |
| 3,986,849 | A | | 10/1976 | Fuderer et al. ............ 55/25 |
| 4,077,779 | A | * | 3/1978 | Sircar et al. .............. 95/26 |
| 4,077,780 | A | | 3/1978 | Doshi ...................... 55/26 |
| 4,194,891 | A | * | 3/1980 | Earls et al. ............... 95/98 |
| 4,194,892 | A | * | 3/1980 | Jones et al. ............... 95/95 |
| 4,228,197 | A | * | 10/1980 | Means .................... 426/419 |
| 4,234,326 | A | * | 11/1980 | Bailey et al. ............. 96/154 |
| 4,702,749 | A | * | 10/1987 | Sircar et al. .............. 95/96 |
| 4,723,966 | A | * | 2/1988 | Fuderer .................... 95/98 |
| 4,795,735 | A | * | 1/1989 | Liu et al. ................. 502/415 |
| 4,964,888 | A | | 10/1990 | Miller ...................... 55/58 |
| 5,096,470 | A | * | 3/1992 | Krishnamurthy .......... 95/102 |
| 5,133,785 | A | | 7/1992 | Kumar et al. .............. 55/26 |
| 5,447,557 | A | * | 9/1995 | Golden et al. ............. 95/96 |
| 5,658,372 | A | * | 8/1997 | Gadkaree ................. 95/116 |
| 5,713,984 | A | * | 2/1998 | Monnot et al. ........... 95/100 |
| 5,792,239 | A | * | 8/1998 | Reinhold et al. .......... 95/101 |
| RE35,913 | E | * | 10/1998 | Hay et al. ................. 95/96 |
| 6,027,549 | A | * | 2/2000 | Golden et al. ............. 95/98 |
| 6,056,804 | A | | 5/2000 | Keefer et al. ............. 95/96 |
| 6,068,680 | A | * | 5/2000 | Kulish et al. ............. 95/98 |
| 6,176,897 | B1 | | 1/2001 | Keefer ..................... 95/98 |
| 6,231,644 | B1 | | 5/2001 | Jain et al. ................ 95/96 |
| 6,261,343 | B1 | * | 7/2001 | Golden et al. ............. 95/96 |
| 6,340,382 | B1 | * | 1/2002 | Baksh et al. .............. 95/96 |
| 6,425,939 | B1 | * | 7/2002 | Moreau et al. ............ 95/117 |
| 6,454,838 | B1 | * | 9/2002 | Xu et al. .................. 95/98 |
| 2001/0027723 | A1 | * | 10/2001 | Jain et al. ................ 95/96 |
| 2002/0014153 | A1 | * | 2/2002 | Baksh et al. .............. 95/96 |
| 2002/0112606 | A1 | * | 8/2002 | Ackley et al. ............. 95/96 |

FOREIGN PATENT DOCUMENTS

| EP | 0008619 | 3/1980 |
| GB | 1443942 | 12/1988 |

* cited by examiner

Primary Examiner—Robert H. Spitzer
(74) Attorney, Agent, or Firm—Keith D. Gourley

(57) ABSTRACT

A pressure swing adsorption process for recovering a product gas from a feed gas, includes: supplying a pressure swing adsorption apparatus including an adsorbent composition containing activated carbon as a major ingredient, wherein the adsorbent composition and the apparatus are substantially free of zeolite adsorbents; feeding a feed gas into the pressure swing adsorption apparatus during a feed period not exceeding 20 seconds; and recovering the product gas from the pressure swing adsorption apparatus. The process and apparatus are particularly suitable for use with fuel cells and other applications requiring compact, rapid cycling systems for producing high purity hydrogen.

17 Claims, 3 Drawing Sheets

ACTIVATED CARBON AS SOLE ABSORBENT IN RAPID CYCLE HYDROGEN PSA

BACKGROUND OF THE INVENTION

This invention relates to rapid pressure swing adsorption (RPSA) processes, and more particularly to hydrogen production via RPSA processes.

The increasing demand for hydrogen, particularly in petroleum refining and processing has provided a strong economic motivation to develop processes to recover hydrogen from refinery fuel gas, coke oven gas and other similar sources as well as from more traditional sources such as reformer off-gas. For most applications, a high purity hydrogen product is required.

The process of production and recovery of hydrogen by steam and/or air reforming of hydrocarbon rich gas streams, such as natural gas, naphtha, or other mixtures of low molecular weight hydrocarbons, is well known in the art. Typical commercial sources for the production of hydrogen include reforming of natural gas or partial oxidation of various hydrocarbons. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless recovery of carbon monoxide is desired, the carbon monoxide is customarily converted to carbon dioxide by water gas shift reaction to maximize the hydrogen content in the stream. Typically, this gas stream is then sent to a PSA unit. Other hydrogen-rich gas sources that can be upgraded by PSA technology to a high purity product include refinery off-gases with $C_1$–$C_6$ hydrocarbon contaminants. See, e.g., U.S. Pat. No. 3,176,444 to Kiyonaga.

In PSA processes, a multi-component gas is passed to at least one of a plurality of adsorption beds at an elevated pressure to adsorb at least one strongly adsorbed component while at least one relatively weakly adsorbed component passes through. In the case of hydrogen production via pressure swing adsorption ($H_2$ PSA), $H_2$ is the weakly adsorbed component, which passes through the bed. See, e.g., U.S. Pat. No. 3,430,418 to Wagner, U.S. Pat. No. 3,564,816 to Batta and U.S. Pat. No. 3,986,849 to Fuderer et al. At a defined time, the feed step is discontinued and the adsorption bed is depressurized in one or more steps, which permit essentially pure $H_2$ product to exit the bed. Then a countercurrent desorption step is carried out, followed by countercurrent purge and repressurization.

$H_2$ PSA processes for the production of high purity $H_2$ (99.9% and higher) from a hydrocarbon reformer effluent have typically used a layered adsorbent approach. Such $H_2$ PSA processing is disclosed in U.S. Pat. No. 3,430,418 to Wagner. The first adsorbent layer is typically activated carbon used for removal of water, $CO_2$ and $CH_4$. The second adsorbent layer is typically a zeolite for removal of CO and $N_2$ to the low levels necessary to generate a high purity $H_2$ stream.

Other patents that use a layered bed approach to produce high purity $H_2$ from reformer effluent include U.S. Pat. No. 3,986,849 to Fuderer et al., U.S. Pat. No. 4,964,888 to Miller; U.S. Pat. No. 5,133,785 to Kumar et al., and U.S. Pat. No. 6,027,549 to Golden et al. In all of these patents, the adsorber on-line (feed) time is on the order of 2 to 6 minutes. In the '849 patent, there is an example with activated carbon as the sole adsorbent for purification of a $H_2$-containing stream with 5.8% $CH_4$ and 2.4% CO. The example suggests that activated carbon allows significant unwanted breakthrough of CO. Subsequent preferred examples all use layered beds of carbon followed by zeolite.

There is other art on the use of carbon only for $H_2$ PSA processes. U.S. Pat. No. 4,077,780 to Doshi teaches a PSA process for separating gas mixtures containing ammonia, argon, methane, nitrogen and hydrogen to recover both nitrogen and hydrogen. Activated carbon is the preferred adsorbent for this application, because it is desired to recover both $N_2$ and $H_2$ from the feed stream. Since carbon has a much lower $N_2/H_2$ selectivity than zeolites, it is the preferred adsorbent for simultaneous $H_2$ and $N_2$ recovery. The feed time taught by Doshi is 5 minutes.

U.S. Pat. No. 6,261,343 to Golden et al. teaches the use of activated carbon only PSA beds for the purification of $H_2$ with $O_2$ and/or Ar impurities in the feed stream. Since Ar and /or $O_2$ are the most weakly adsorbed components in the $H_2$-containing feed stream after $H_2$, their breakthrough will determine the on-line time. The '343 patent teaches that active carbon has improved $O_2$ and Ar removal capability over zeolites and is therefore the preferred adsorbent when the $H_2$ purity is limited by $O_2$ and/or Ar breakthrough.

U.S. Pat. No. 4,077,779 to Sircar et al. teaches the use of active carbon only beds for production of $H_2$ from $CO_2/H_2$ mixtures. Thus, the carbon is being used for bulk $CO_2$ removal from $H_2$. The feed time disclosed in the '779 patent is 4 minutes.

The cost of hydrogen from integrated reformer/PSA systems is impacted by both the capital and operating costs of the system. Reducing the cycle time of the PSA can significantly reduce the capital cost of the PSA. As the cycle time decreases, the bed size also decreases resulting in a reduction in plant capital costs.

In addition, with the advent of fuel cell technology it is of considerable interest to develop micro-hydrogen generators. For example, a fuel cell powered car with an on-board reformer would require a small hydrogen purification unit. The ultimate goal is to develop as small a purification unit as possible to produce a given volume flow of hydrogen. The volume of bed required to produce a given flow of hydrogen can be termed a bed sizing factor with units of $ft^3$ of bed/$ft^3$ of $H_2$/sec. Thus, it is desired to obtain a hydrogen purification system with as small a bed sizing factor as possible. In order to reduce the bed size of the hydrogen PSA to fit under the hood of a car, fast cycles are required.

There are a number of patents that teach rapid cycle PSA processes. U.S. Pat. No. 6,231,644 to Jain et al. describes an improved air separation process utilizing a monolithic adsorbent material where the cycle time is 35 seconds. U.S. Pat. Nos. 6,176,897 and 6,056,804 to Keefer et al. disclose the operation of an ultra rapid PSA system using adsorbent laminate modules at a cyclic frequency of 100 cycles per minute, which corresponds to a cycle time of 0.6 second and even possibly as high as 600 cycles per minute (0.1 second cycle time). These patents illustrate rapid pressure adsorption systems operating at very short cycle times and necessitating novel adsorbent configurations, process cycle and mechanical device innovations. The end goal of these patents is to minimize the bed size required for production of a given flow of hydrogen (minimize the bed size factor). None of these patents teach the use of activated carbon as the preferred or sole adsorbent for RPSA applications.

Despite the foregoing developments, it is desired to provide improved RPSA systems and processes comprising the use of activated carbon for gas separation.

It is further desired to provide such improved RPSA systems and processes for producing hydrogen having a purity of at least 99.9%.

All references cited herein are incorporated herein by reference in their entireties.

BRIEF SUMMARY OF THE INVENTION

The invention provides a pressure swing adsorption process for recovering a product gas from a feed gas, which process comprises: supplying a pressure swing adsorption apparatus including an adsorbent composition containing activated carbon as a major ingredient, wherein the adsorbent composition and said apparatus are substantially free of zeolite adsorbents; feeding a feed gas into the pressure swing adsorption apparatus during a feed period not exceeding 20 seconds; and recovering the product gas from the pressure swing adsorption apparatus.

Also provided is an apparatus for performing the process of the invention.

The process and apparatus are particularly suitable for use with fuel cells and in other applications requiring compact, rapid cycling systems for producing high purity hydrogen.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
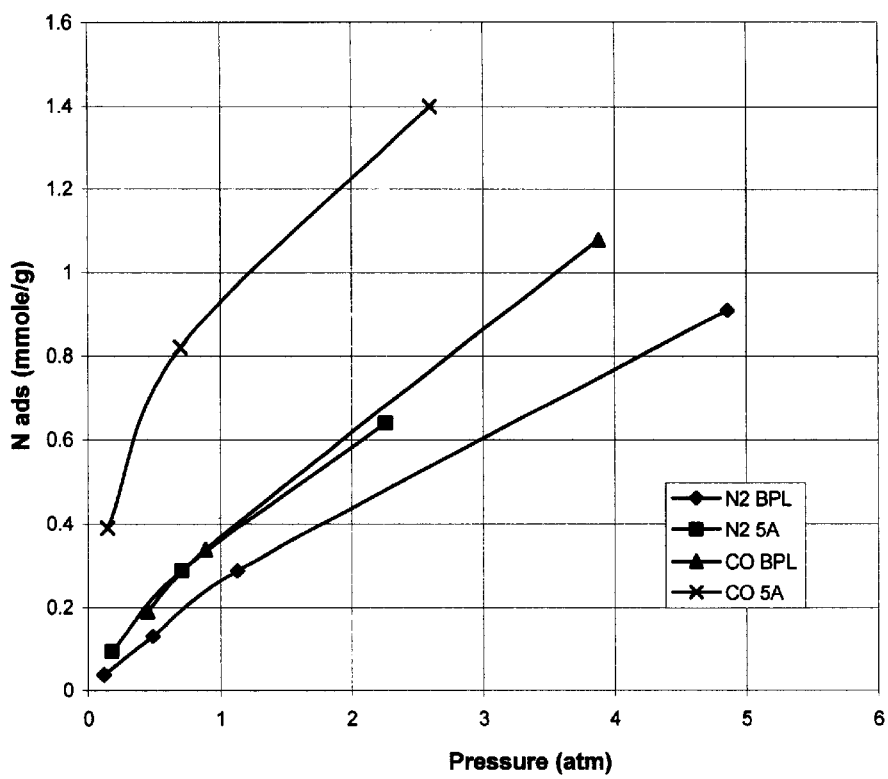
FIG. 1 is a graph showing CO and $N_2$ isotherms on 5A and BPL active carbon.

In order to reduce the size of the existing PSA systems and still maintain the same product throughput, the process cycle time needs to be reduced and, consequently, the process stream flow rate needs to be increased. Maintaining a low pressure drop and achieving a fast transfer rate of the sorbate/molecules from the gas to the adsorbed phase becomes crucial in a rapid PSA configuration when the molecules residence time in the adsorber is shortened.

The inventors have found that the mass transfer/pressure drop characteristics of typical PSA adsorbents make them unsuitable for RPSA. Clearly, optimal adsorbents for RPSA should maintain or improve PSA performance and minimize required bed sizes, as cycle times decrease. In addition, it is preferred that the adsorbent of choice be able to function in a stand-alone basis for ease of column loading. It is also preferable for the adsorbent of choice to be readily manufactured in a structured form to obtain high mass transfer rates, low bed pressure drop and resistance to fluidization.

Accordingly, this invention provides a RPSA process for recovering a product gas from a feed gas using as the sole adsorbent a composition containing activated carbon, more preferably containing activated carbon as a major ingredient (i.e., more than 50 wt. % activated carbon), even more preferably consisting essentially of activated carbon, most preferably consisting of only activated carbon. The invention flows from the surprising discovery that an activated carbon adsorbent outperforms conventional carbon/zeolite mixed beds for CO and $N_2$ removal as on-line (feed) times in the $H_2$PSA reach values of about 20 seconds or less. This result is quite surprising since typically polar adsorbents like zeolites are conventionally understood to be required on the product end of $H_2$ PSA adsorbers to ensure high levels of CO and $N_2$ removal from the $H_2$-rich feed stream.

Forms of activated carbon that are suitable for use in the invention are not particularly limited, and include, e.g., activated carbon beads, granules, monoliths, sintered beds and the like. A preferred form of activated carbon for use in the invention is activated carbon fabric, as disclosed in our related application Ser. No. 10/094,362 and the title SELF-SUPPORTED STRUCTURED ADSORBENT FOR GAS SEPARATION, filed on the same day as this application.

The activated carbon adsorbent can be chemically treated by impregnation with metal salts, oxidized or reduced. As taught by U.S. Pat. No. 4,702,749 to Sircar et al., oxidation of the carbon surface can increase the concentration of surface oxygen groups on the carbon. The increased polarity of the carbon surface may increase the adsorption capacity of polar compounds like CO and $N_2$. As shown in Example 4, below, impregnation of carbon surfaces with CuCl improves the CO capacity of carbon.

While the process is preferably performed using as the sole adsorbent a composition containing activated carbon, it is also possible in alternative embodiments of the invention to employ at least one additional adsorbent composition in conjunction with the activated carbon adsorbent, provided that the additional adsorbent composition is substantially free of zeolites. The composition containing activated carbon is also substantially free of zeolites in preferred embodiments, as is the entire apparatus.

In the process of the invention, components of a feedstock (preferably a gas) are adsorbed to the adsorbent(s) in the apparatus to separate the desired product (preferably a gas) from the balance of the feedstock components. Suitable feed gases comprise a mixture of hydrogen and at least one other component selected from the group consisting of carbon dioxide, carbon monoxide, hydrocarbon, oxygen, methane, argon and nitrogen. Gaseous mixtures comprising hydrogen, oxygen and nitrogen are preferred for use in the invention. Particularly preferred feed gases comprise 30 to 90% $H_2$, 5 to 25% $CO_2$, 0.1 to 8% CO, 0.1 to 20% $N_2$ and 0.1 to 8% $CH_4$ (the foregoing percentages are by volume). The use of air as the gaseous mixture is excluded in certain embodiments (although air can be a component of the mixture in at least some embodiments). The invention is suitable for a variety of gas separations including $H_2$ purification, CO production, hydrocarbon removal or recovery and the like.

The product of the invention is preferably hydrogen gas of high purity. Thus, the invention is capable of providing product gas containing at least 99.9% hydrogen, preferably at least 99.99% hydrogen.

The feed gas is preferably provided at a temperature of 0 to 100° C., and fed into the apparatus at a preferred feed pressure from 20 to 500 psig (0.14 to 3.4 MPa). Preferred feed times are 20 seconds or less. Preferred feed G-rates are 150 lbmoles/hr/ft$^2$ or higher.

PSA cycles of the invention preferably include at least feed, pressure equalization, depressurization, purge and repressurization steps. As used herein, the term "PSA" covers not only the strictly speaking PSA processes, but also similar processes such as VSA (Vacuum Swing Adsorption) and MPSA (Mixed Pressure Swing Adsorption). The number of pressure equalizations and number of beds are not particularly limited.

If desired, the adsorbent(s) can be regenerated by, e.g., vacuum regeneration.

The invention will be illustrated in more detail with reference to the following Examples, but it should be understood that the present invention is not deemed to be limited thereto.

EXAMPLE 1

Adsorption isotherms for $N_2$ and CO were measured at 30° C. on Calgon BPL (Pittsburgh, Pa.) activated carbon and 5A zeolite from UOP (Des Plaines, Ill.). The isotherms are shown in FIG. 1. 5A has a higher $N_2$ and CO capacity than BPL activated carbon. This is why a final layer of 5A zeolite is often used as the final adsorbent layer in $H_2$ PSA processes, especially when high purity $H_2$ is required. The 5A capacity for $N_2$ is 1.7 times higher than that for BPL (based on ratios of Henry's constants), while 5A has a 6.2 times greater CO capacity than BPL. Use of higher capacity adsorbents reduces bed size and optimizes process performance.

EXAMPLE 2

Preferred adsorbents for use in adsorption applications should have both desired equilibrium and mass transfer properties. In addition to good capacity, it is also desired that the adsorbents used exhibit fast mass transfer rates. The effect of improved mass transfer rate is especially important when cycle times get short and gas flow rates are high. The uptake rate of $CO_2$ was measured on 1 mm 5A zeolite beads from UOP and 1 mm granular activated carbon type PCB from Calgon. The uptake rate was measured in a standard volumetric adsorption unit at 30° C. with a starting pressure of 50 torr (6.7 KPa) of $CO_2$. By measuring the decay in pressure as a function of time, a plot of the fractional approach to equilibrium versus time was constructed. From these plots, a linear driving force mass transfer coefficient can be obtained. Derivation of the linear driving force mass transfer coefficient is described in a number of references including "Principles of Adsorption and Adsorption Processes", D. Ruthven, John Wiley and Sons, 1984.

Figure 2:
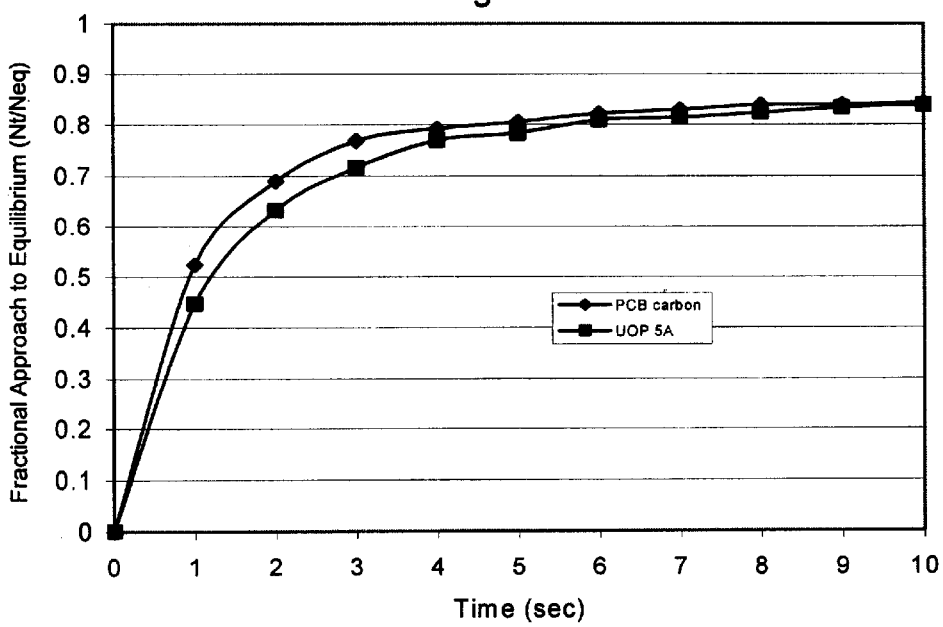
FIG. 2 is a graph showing $CO_2$ uptake at 30° C. on carbon and zeolites.

The $CO_2$ uptake plots are shown in FIG. 2. The data in FIG. 2 show that the $CO_2$ uptake rate is faster for the carbon than the zeolite. The linear driving force mass transfer coefficients derived from the plots are 0.75 sec$^{-1}$ and 0.60 sec$^{-1}$, respectively for the carbon and the zeolite. Thus, Examples 1 and 2 show that while activated carbon has inferior equilibrium properties versus zeolites for CO and $N_2$ adsorption, it also has improved mass transfer properties. The improved mass transfer properties of carbon have not been previously appreciated.

EXAMPLE 3

A computer simulation package was used to estimate $H_2$PSA performance with a feed gas containing 73% $H_2$, 15% $CO_2$, 5.5% CO, 5.5% $CH_4$ and 1% $N_2$. The feed pressure was 325 psig (23.1 atm/2.24 MPa) and the feed temperature was 70° F. (21° C.). The product purity was 10 ppm CO. The PSA cycle employed was a 5-bed cycle with 2 pressure equalization steps (a cycle disclosed in U.S. Pat. No. 3,564,816 to Batta). The effect of cycle time on PSA performance was simulated for two different adsorbent splits, one a 60% carbon/40% zeolite bed and the other an all carbon bed. The results of the simulations are shown in Table 1.

TABLE 1

| Adsorbents | 60-second feed | | 30-second feed | | 15-second feed | |
| --- | --- | --- | --- | --- | --- | --- |
| | Recovery (%) | Relative Production | Recovery (%) | Relative Production | Recovery (%) | Relative Production |
| Carbon/zeolite | 88.8 | 1.0 | 87.4 | 0.92 | 82.0 | 0.71 |
| Carbon | 85.8 | 0.88 | 85.0 | 0.84 | 82.2 | 0.73 |

The results in Table 1 show the $H_2$ recovery and the relative $H_2$ production (feed gas processed per volume of bed per cycle) for the two different bed splits at three different feed times. At a 60-second feed time, the layered bed of carbon/zeolite has a 3 percentage point higher $H_2$ recovery and a 12% higher volumetric $H_2$ production (i.e., the system requires 12% less bed volume). However, as the feed time decreases below 30 seconds to 15 seconds, the carbon only bed has higher $H_2$ recovery and higher $H_2$ production. The results in Table 1 clearly and unexpectedly show that adsorbent performance is a function of feed time. That observation has not been appreciated previously.

The results in Table 1 can also be expressed in terms of feed flow rate. A typical way to express feed flows in adsorption system is in units of lbmoles of flow/ft$^2$ of bed cross-sectional area/hr, often called the feed G-rate. The results in Table 1 for $H_2$ recovery are plotted as a function of feed G-rate in FIG. 3.

Figure 3:
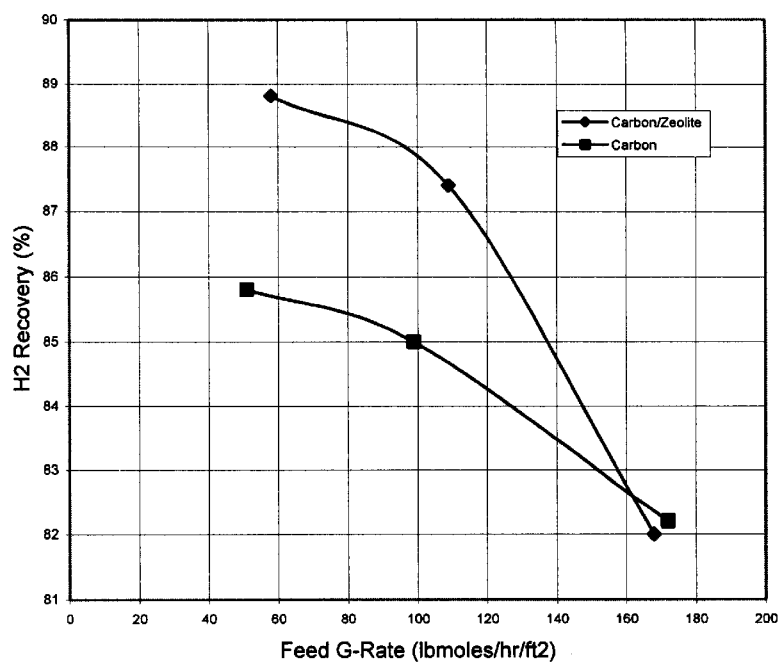
FIG. 3 is a graph showing an effect of feed G-Rate on $H_2$ recovery.
Figure 4:
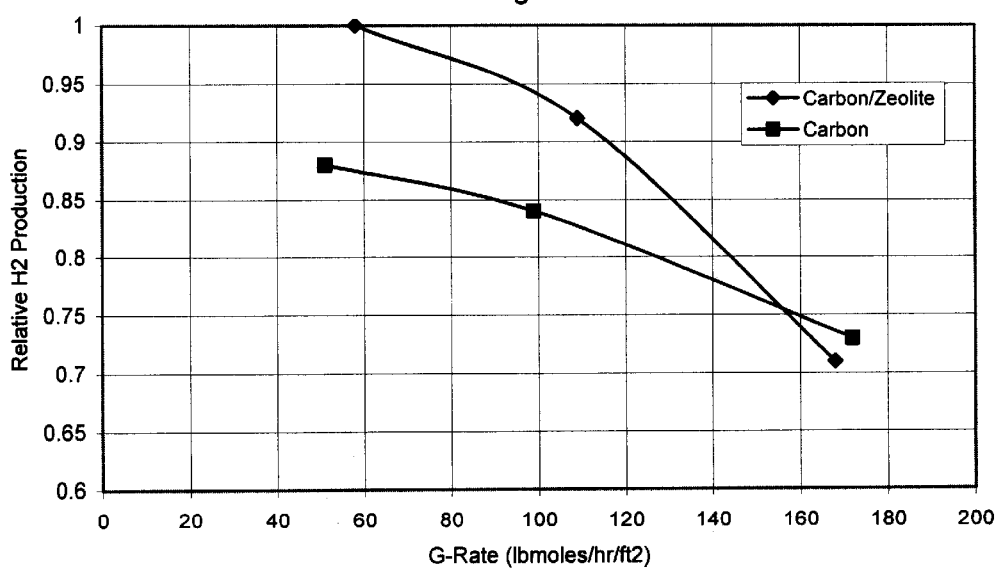
FIG. 4 is a graph showing an effect of feed G-Rate on $H_2$ production.

The results in FIG. 3 show that once feed G-rates exceed 160 lbmoles/hr/ft$^2$, the carbon only bed outperforms the layered carbon/zeolite bed. FIG. 4 shows that the same holds true for $H_2$ production. Thus, at short feed times and fast feed flow rates, an unlayered bed consisting of carbon outperforms a layered bed of carbon and zeolite.

EXAMPLE 4

Figure 5:
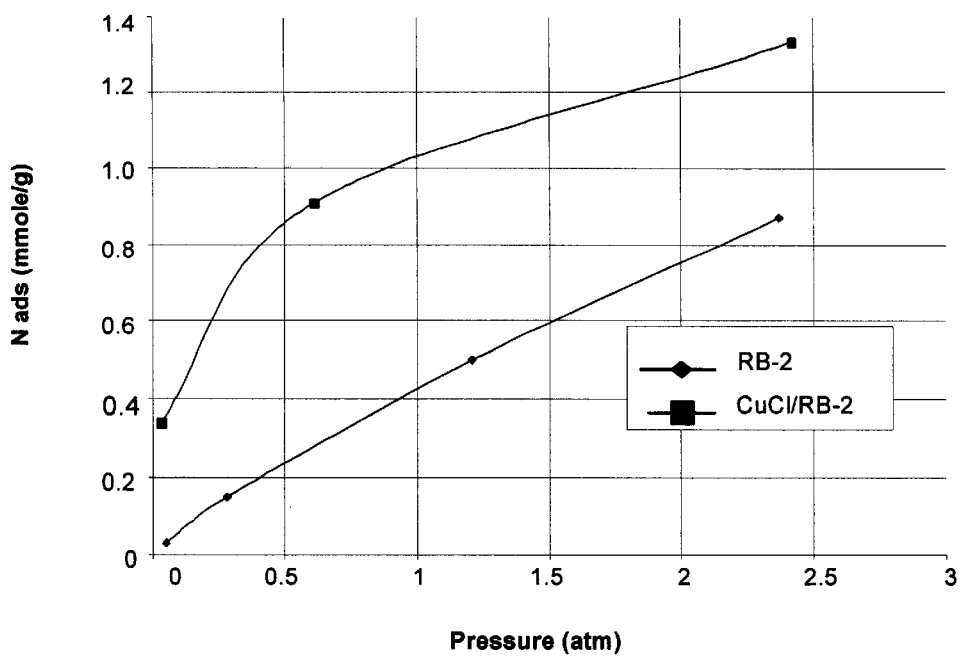
FIG. 5 is a graph showing CO isotherms on unmodified carbon and CuCl-impregnated carbon at 30° C.

It is well known that surface modification of activated carbon surfaces can be accomplished by impregnation with various salts or by chemical reactions. Accordingly, twenty grams of Norit (Atlanta, Ga.) RB-2 activated carbon were impregnated with 10 grams of CuCl by dissolution of CuCl in $NH_4OH$ and impregnation on the carbon. Following air-drying at 120° C., the material was then activated in $N_2$ at 300° C. The CO isotherms on the as-received carbon and CuCl-impregnated carbon at 30° C. are shown in FIG. 5. The results clearly show that impregnation of the carbon surface with CuCl improves its CO capacity. Thus, it is expected that a chemically modified carbon with improved CO and $N_2$ capacity may further improve the performance of a carbon adsorbent for $H_2$ purification.

Finally, at the short feed times and high G-rates outlined in this invention, the gas velocities obtained during PSA processing are quite high. At these high gas velocities, fluidization of the adsorbent mass becomes an issue. Another advantage of carbon-based adsorbents for rapid cycle PSA application is that carbon is very easily manufactured into a structured form like a sintered block or monolith. This is another advantage of an all carbon or modified carbon adsorbent for $H_2$ purification.

EXAMPLE 5

Another way to look at the benefit of fast cycle PSA is to look at bed size factors (BSF) or the volume of bed required to produce a given flow of $H_2$ product. The previous production values presented in Table 1 were based on a per cycle basis. Table 2 below gives the production values based on a per unit time basis.

TABLE 2

| Adsorbent | Relative BSF at 60 sec feed time | Relative BSF at 30 sec feed time | Relative BSF at 15 sec feed time |
|---|---|---|---|
| Carbon/Zeolite | 1.0 | 0.54 | 0.35 |
| Carbon | 1.13 | 0.60 | 0.34 |

The results in Table 2 show that the bed size decreases to produce a given flow of $H_2$ as the cycle time (feed time) decreases. At a feed time of 60 seconds, the bed volume required to produce a given flow of $H_2$ is 13% higher for the carbon only bed versus the carbon/zeolite bed. However, as the feed time decreases to 15 seconds, the carbon only bed slightly outperforms the carbon/zeolite bed. A big advantage of using short feed times is demonstrated in Table 2. The bed volume required for a given $H_2$ flow decreases by a factor of 2.86 (1.0/0.35) for the carbon/zeolite bed and by a factor of 3.32 (1.13/0.34) as the feed time decreases from 60 seconds to 15 seconds. This clearly shows the effect of feed time on bed size.

Figure 6:
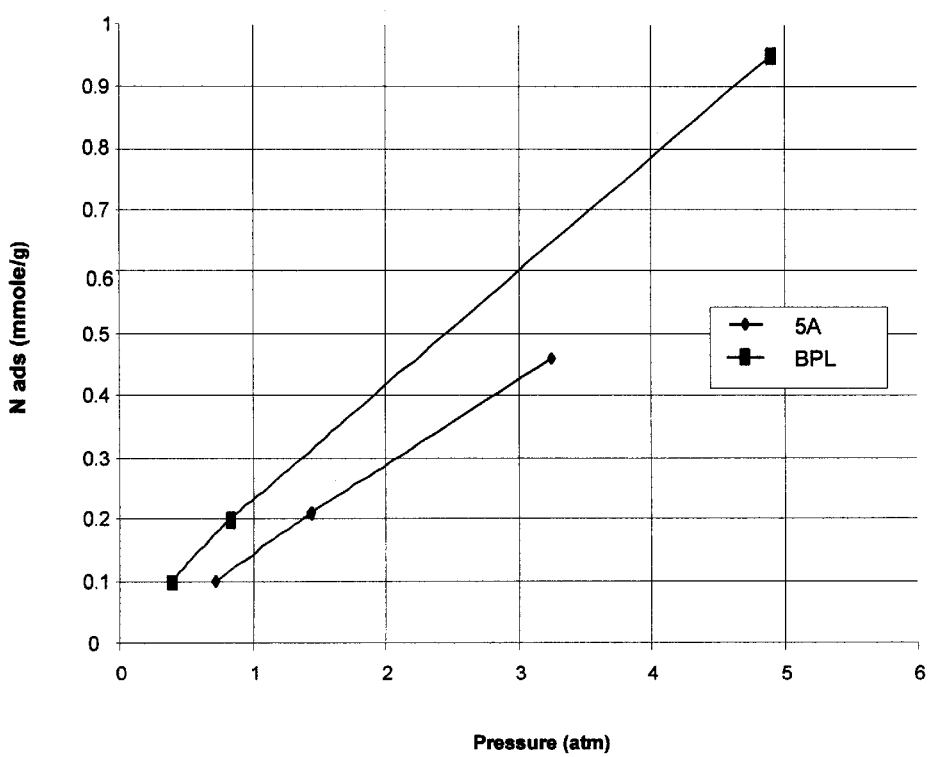
FIG. 6 is a graph showing $O_2$ isotherms at 30° C. on BPL carbon and 5A zeolite.

FIG. 6 shows the $O_2$ isotherms at 30° C. on BPL carbon and 5A zeolite. Clearly, the preferred adsorbent is the carbon, which shows an improved $O_2$ capacity over 5A zeolite.

While the invention has been described in detail and with reference to specific examples thereof, it will be apparent to one skilled in the art that various changes and modifications can be made therein without departing from the spirit and scope thereof.

What is claimed is:

1. A pressure swing adsorption process for recovering a product gas from a feed gas, said process comprising:

supplying a multiple-bed pressure swing adsorption apparatus comprising an adsorbent composition containing activated carbon as a major ingredient, wherein said adsorbent composition and said apparatus are substantially free of zeolite adsorbents;

feeding a feed gas into said pressure swing adsorption apparatus during a feed period not exceeding 20 seconds, said feed gas comprising a mixture of hydrogen and at least one other member selected from the group consisting of carbon dioxide, carbon monoxide, hydrocarbon, oxygen, methane, argon and nitrogen; and recovering said product gas from said pressure swing adsorption apparatus, provided that when said product gas is hydrogen a rate of hydrogen recovery is greater than 82%.

2. The process of claim 1, wherein said adsorbent composition consists essentially of activated carbon.

3. The process of claim 2, wherein said adsorbent composition consists of activated carbon.

4. The process of claim 2, wherein said apparatus contains no adsorbent other than said adsorbent composition.

5. The process of claim 2, wherein said apparatus further comprises at least one optional adsorbent composition in addition to said adsorbent composition.

6. The process of claim 2, wherein said adsorbent composition is provided as a monolith, a bed of beads, a bed of granules or a sintered bed.

7. The process of claim 2, wherein said adsorbent composition is provided as a self-supported fabric.

8. The process of claim 2, wherein said adsorbent composition is modified prior to said supplying by impregnation with metal salts, oxidation, reduction and/or ion exchange.

9. The process of claim 2, wherein said adsorbent composition is modified prior to said supplying by impregnation with CuCl.

10. The process of claim 2, wherein said feed gas comprises 30 to 90% $H_2$, 5 to 25% $CO_2$, 0.1 to 8% CO, 0.1 to 20% $N_2$ and 0.1 to 8% $CH_4$.

11. The process of claim 2, wherein a purity of $H_2$ in said product gas is not limited by $O_2$ and/or Ar breakthrough.

12. The process of claim 2, wherein said product gas comprises at least 99.9% hydrogen.

13. The process of claim 2, wherein during said feeding, said feed gas has a feed temperature of 0 to 100° C. and a feed pressure of 20 to 500 psig (0.14 to 3.4 MPa).

14. In a pressure swing adsorption process having a cycle time not exceeding twenty seconds and comprising contacting an adsorbent with a gaseous mixture to provide a product gas containing hydrogen and a reduced amount of at least one impurity selected from the group consisting of carbon dioxide, carbon monoxide, hydrocarbon, oxygen, methane, argon and nitrogen, the improvement wherein said adsorbent consists essentially of activated carbon, no other adsorbent is used in said process; the process is conducted in a multiple-bed pressure swing adsorption apparatus and a rate of hydrogen recovery is greater than 82%.

15. The process of claim 14, wherein said adsorbent consists of activated carbon.

16. A multiple-bed pressure swing adsorption process for recovering a product gas from a feed gas, said process comprising:

supplying a multiple-bed pressure swing adsorption apparatus comprising an adsorbent composition consisting essentially of activated carbon, wherein said adsorbent composition and said apparatus are substantially free of zeolite adsorbents;

feeding a feed gas into said pressure swing adsorption apparatus during a feed period not exceeding 20 seconds, said feed gas comprising 30 to 90% $H_2$, 5 to 25% $CO_2$, 0.1 to 8% CO, 0.1 to 20% $N_2$ and 0.1 to 8% $CH_4$; and recovering said product gas from said pressure swing adsorption apparatus, provided that when said product gas comprises at least 99.9% hydrogen, a rate of hydrogen recovery is at least 60%.

17. The process of claim 16, wherein the rate of hydrogen recovery is at least 70%.

* * * * *

UNITED STATES PATENT AND TRADEMARK OFFICE
CERTIFICATE OF CORRECTION

PATENT NO. : 6,660,064 B2
DATED : December 9, 2003
INVENTOR(S) : Timothy Christopher Golden and Edward Landis Weist It is certified that error appears in the above-identified patent and that said Letters Patent is hereby corrected as shown below:

<u>Title page, Item [54] and Column 1, line 2,</u>
Title, delete the word "ABSORBENT" and substitute therefore -- ADSORBENT --.

Signed and Sealed this

Sixteenth Day of March, 2004

JON W. DUDAS
*Acting Director of the United States Patent and Trademark Office*